United States Patent [19]

Nagano

[11] 4,193,309
[45] Mar. 18, 1980

[54] SPEED-CHANGING DEVICE FOR BICYCLE

[75] Inventor: Masashi Nagano, Sakai, Japan

[73] Assignee: Shimano Industrial Company Limited, Osaka, Japan

[21] Appl. No.: 706,372

[22] Filed: Jul. 19, 1976

[30] Foreign Application Priority Data

Aug. 1, 1975 [JP] Japan .................................. 50-94647
Dec. 29, 1975 [JP] Japan ........................... 50-180312[U]
Apr. 27, 1976 [JP] Japan ............................. 51-54117[U]

[51] Int. Cl.² ...................... F16H 11/00; G05G 11/00;
G05G 1/00; F16C 1/10
[52] U.S. Cl. .............................. 74/217 B; 74/489;
74/491; 74/501 R; 74/242.11 B
[58] Field of Search ..................... 74/217 B, 242, 489,
74/501 R, 531, 491, 242.11 B; 280/236

[56] References Cited
U.S. PATENT DOCUMENTS

| 609,570 | 8/1898 | Bowden | 74/501 |
|---|---|---|---|
| 1,319,627 | 10/1919 | Sentinella | 74/489 |
| 2,330,444 | 9/1943 | Park | 74/501 M |
| 3,362,238 | 1/1968 | Hayashi et al. | 74/217 B |
| 3,362,249 | 1/1968 | Richoux | 74/501 P |
| 3,386,310 | 6/1968 | Haddad | 74/489 |
| 3,394,604 | 7/1968 | Kimura | 74/242 |
| 3,442,148 | 5/1969 | Juy | 74/489 |
| 3,453,899 | 7/1969 | Tarutani et al. | 74/242 |
| 3,481,217 | 12/1969 | Maeda | 74/489 |
| 3,534,627 | 10/1970 | Schwerdhofer | 74/489 |
| 3,678,964 | 7/1972 | Andrews | 74/501 P |
| 3,868,865 | 3/1975 | Neyer | 74/501 R |
| 3,896,679 | 7/1975 | Huret et al. | 74/217 B |
| 3,969,952 | 7/1976 | McKee et al. | 74/501 M |
| 3,974,707 | 8/1976 | Nagano | 74/217 B |
| 3,979,962 | 9/1976 | Kebsch | 74/217 B |
| 4,002,080 | 1/1977 | Huret et al. | 74/217 B |

FOREIGN PATENT DOCUMENTS 1317530  1/1963  France .................................. 74/501

Primary Examiner—Samuel Scott
Assistant Examiner—Randall L. Green
Attorney, Agent, or Firm—Stevens, Davis, Miller & Mosher

[57] ABSTRACT

A speed-changing device for a bicycle, comprising a derailleur, a control lever and a transmitting device formed of an outer cable and a less flexible inner wire. One end of the outer cable is fixed to the derailleur and the other end is fixed to the control lever. The lever is reciprocally operable to push or pull the inner wire for allowing a movable member of the derailleur to be reciprocated, whereby a single wire can, without a return spring, lightly effect the bicycle's speed change.

4 Claims, 13 Drawing Figures

SPEED-CHANGING DEVICE FOR BICYCLE

This invention relates to a speed-changing device for a bicycle and more particularly to a speed-changing device for a bicycle, comprising a movable member having a chain guide cage movably supported on a fixing member through linkage members, a control lever and a transmitting means for transmitting the lever's action to the members at a movable portion of the derailleur.

Conventionally, this kind of speed-changing device for a bicycle is adapted to provide a return spring so that a control wire is pulled to force a guide cage to be moved toward one side against the spring force and toward the other side by the restoration of the spring and the control lever, which is applied with rotation resistance like frictional resistance, forces the chain guide cage to stop at a regular position so as to be kept in a desired speed change stage.

Hence, this system is required not only to act on the control lever with a force in excess of the rotation resistance but also beyond the spring force for operating the lever against the force of the spring. As a result, such a system is defective because the control lever becomes heavier in operation.

As a substitute for a return spring, another device has two control wires. One of the wires is pulled to move the chain guide cage from the low speed change stage to the high and the other is pulled to move the chain guide from the high speed change to the low speed change. This device is provided to eliminate the abovementioned defect and make the control lever lightly operable. However, the derailleur of this device is structurally complex and too expensive to use because of the two control wires.

The invention has been designed to completely solve the aforesaid problems. A main object of the invention is to provide a speed-change device having a control lever, which is lightly operable for a derailleur. Another object is to provide a speed-changing device which operates the derailleur by a single wire, is simple in construction, is inexpensive to manufacture, and does not have such defects as complicated structure and high cost from use of two control wires.

The invention is characterized in that the transmitting means is composed of one outer cable and one inner wire, the outer cable being retained at one end to a fixed body formed at the control lever and at the other end to a fixing member of the derailleur. The inner wire is extended at both ends thereof straight along extension lines of the outer cable from the retained portions thereof so as to be retained to the control lever and the derailleur respectively, whereby reciprocal operation of the lever causes the inner wire's push-pull action to change the bicycle's speed.

Namely, the invention is directed to control the derailleur in reciprocation of the movable member thereof by use of a control wire of the push-pull type, larger in diameter and less flexible, so that the derailleur may be lightly operable without the return spring required for a conventional one.

The abovementioned objects and features of the invention and others will be apparent from the embodiments detailed in the following description in accordance with the accompanying drawings, in which.

Figure 7:
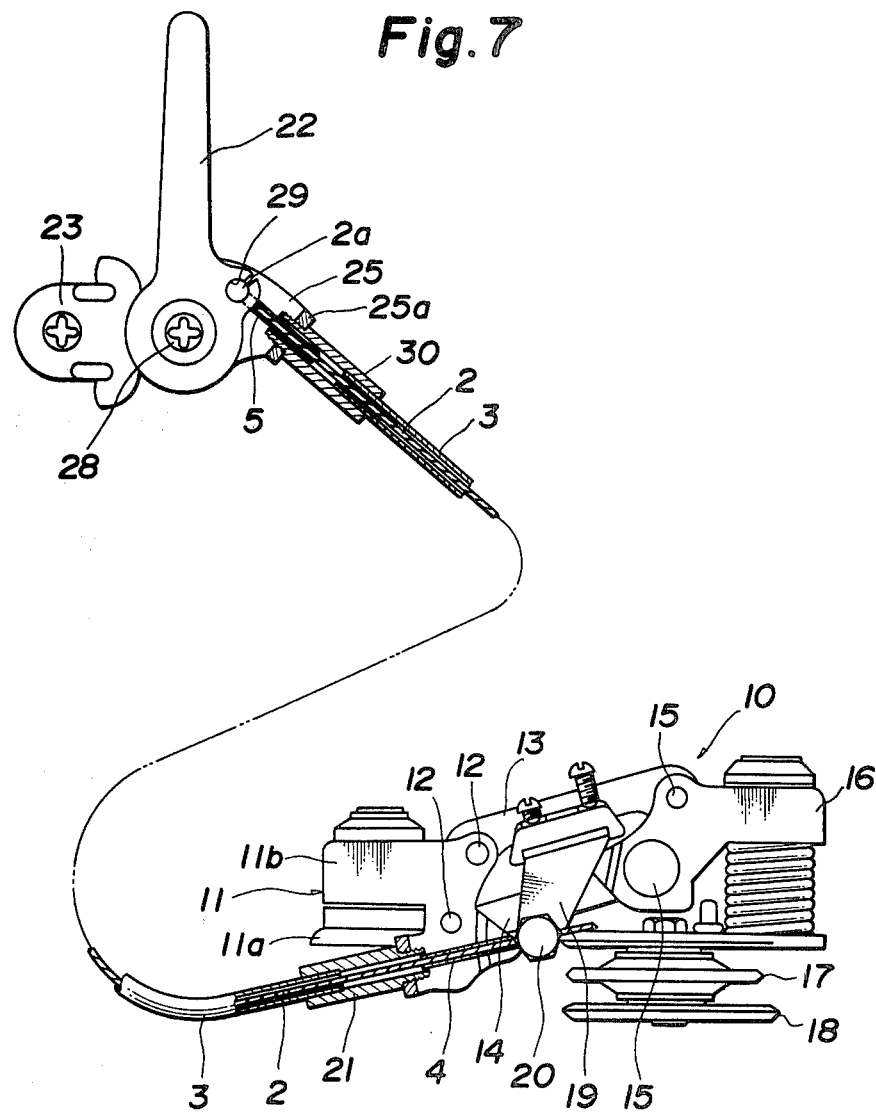
Figure 8:
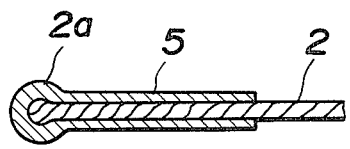
Figure 9:
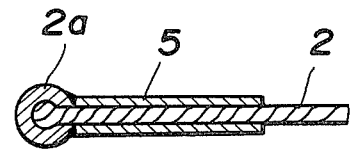
Figure 10:
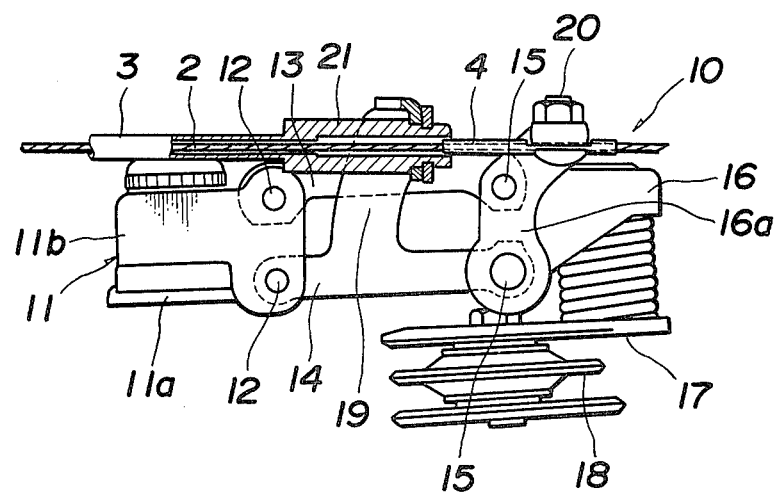
Figure 11:
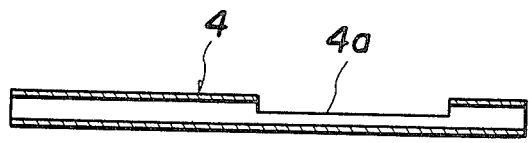
Figure 12:
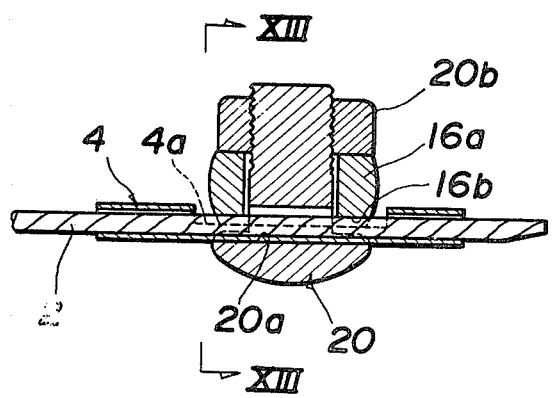
Figure 13:
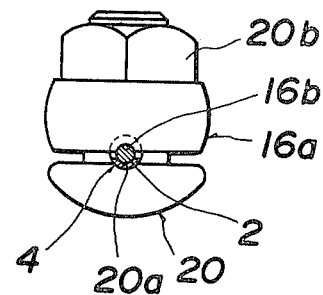

FIG. 7 is a partially cutaway schematic view showing a further modified embodiment of the speed-changing device of the invention, FIGS. 8 and 9 are enlarged sectional views showing terminals of the inner wire only, FIG. 10 is a partially cutaway plan view of a still further embodiment, FIG. 11 is an enlarged sectional view of a sleeve only, FIG. 12 is an enlarged sectional view of a retained portion of one end of the inner wire and a sleeve, and FIG. 13 is a sectional view taken on line XIII—XIII in FIG. 12.

Referring to the drawings, the speed-change device of the invention is exemplified to be applied to a derailleur 10 at the rear side of the bicycle, mounted correspondingly to a multispeed freewheel at a rear hub. The derailleur 10 could be a front derailleur provided with respect to a plurality of front gears.

The derailleur 10 shown in the drawings is composed of: a bracket 11a fixed to the bicycle frame; a fixing member 11 having the fixed body 11b rotatably supported on the bracket 11a through a given range only; two parallel linkage members 13 and 14 mounted to the fixing member 11 through pins 12 respectively; a movable member 16 supported with the two linkage members 13 and 14 through pins 15; and a chain guide cage 18 having two guide pulleys 17 and supported with the movable member 16. The movable member 16 is movable under approximately constant resistance against its travel from the low speed change stage to the high and vice versa.

The derailleur of the invention requires no return spring as used in a conventional one, but is free following travel of the movable member 16. The aforesaid resistance may be equalized without any spring between the fixing member 11 and the linkage members 13 and 14. However, a weak auxiliary spring for compensating the lever action, for example, push operation thereof, could be used with the invention.

A support plate 19 is mounted on outer link 13 of the linkage members 13, 14. The support plate 19 extends toward the inner link 14. The support plate 19 is provided at the tip thereof with a holder 20 for retaining therewith an inner wire of a transmitting means to be hereinafter described. The holder 20 is located linearly opposite to a holder 21 for retaining therewith an outer cable of the transmitting means, on the fixing member 11, so that the inner wire 2 may be fixed at one end thereof to the holder 20 in alignment with the extension line of the outer cable retained by the holder 21.

Figure 1:
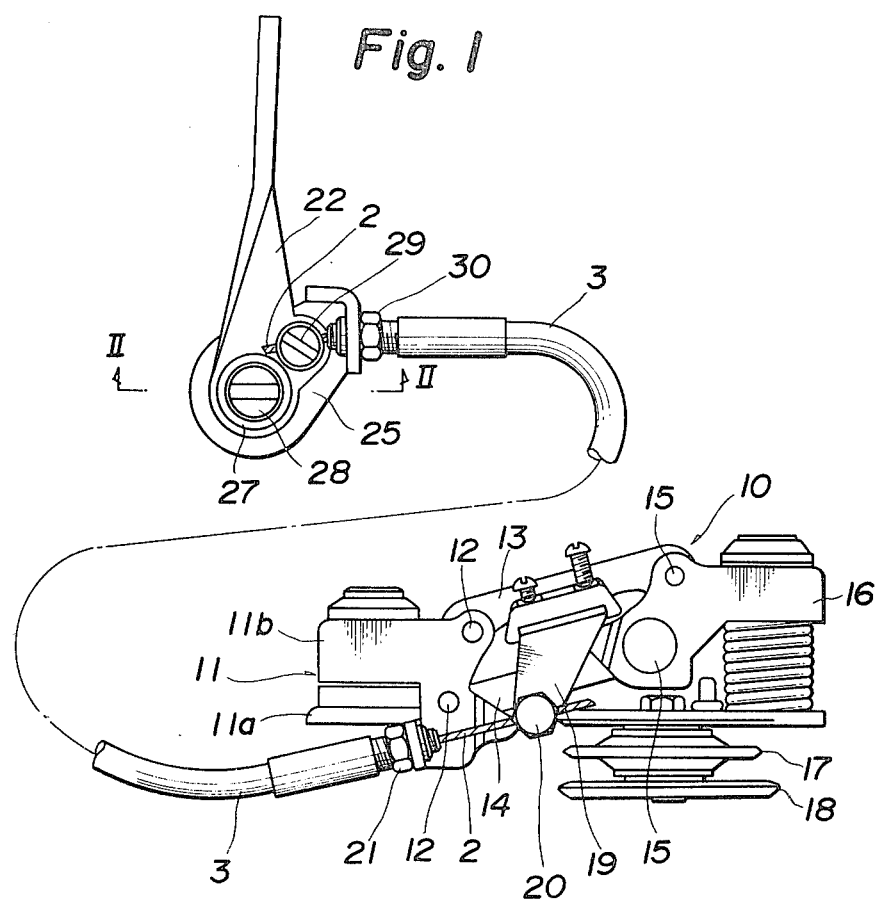
FIG. 1 is a schematic view of an embodiment of the invention.
Figure 2:
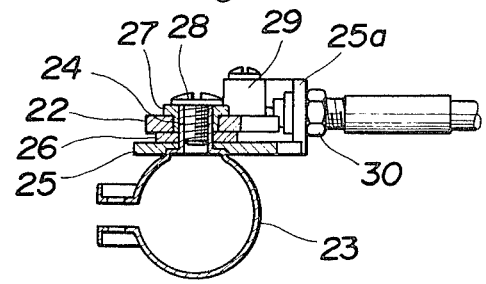
FIG. 2 is a sectional view taken on line II—II in FIG. 1.

The movable member 16 of the derailleur 10, constructed as aforesaid, moves by push-pull action of the inner wire caused by moving a control lever 22 back and forth. The control lever 22 is, as shown in FIG. 2, rotatably supported about a tubular shaft 24 projecting from a tight band 23 fixed to the bicycle frame (not shown).

The tubular shaft 24 is internally threaded and is enlarged at the root portion in a square-shape. A fixing plate 25 is non-rotatably inserted onto the square root portion. The lever 22 is then inserted at its axial hole onto the tubular shaft 24 through a washer 26. Then, a screw 28 is screwed into the shaft 24 through a bushing 27, so that the lever 22 is rotatably supported on the tubular shaft 24 and has a predetermined frictional resistance against movement thereof due to the screwing. The frictional resistance must be, when the chain is meshed with a selective sprocket through the movable member 16 by operating the control lever 22, of a value sufficient to prevent the chain from accidentally shifting from its meshing position. That value may be far smaller than that of a conventional device employing a return spring.

The control lever 22, constructed as aforesaid, is provided to the side of the axial hole with a holder 29 for retaining one end of the inner wire 2 and at a rising 25a of the fixing plate of the lever with a holder 30 for one end of the outer cable 3. The holder 29 is on the same side as the derailleur and linearly opposite the holder 30 so that the one end of the inner wire 2 may be fixed in alignment with the extension line of the outer cable 3 retained by the holder 30.

The transmitting means connecting the control lever 22 and derailleur 10 employs, as the inner wire 2, a so-called push-pull wire of relatively larger diameter and less flexibility. The inner wire 2 is retained at one end thereof by the holder 29 provided at the control lever 22 and at the other end thereof by the holder 20 at the support plate 19, and the outer cable 3 is retained at one end thereof by the holder 30 formed at the fixing plate 25 and at the other end thereof by the holder 21 at the fixing member 11 of the derailleur 10, whereby the control lever 22 may be turned back and forth to cause the inner wire 2 which is pushed or pulled to reciprocate the movable member 16.

Spaced intervals, between the holder 29 for the inner wire 2 and the holder 30 for the outer cable 3 at the control lever side and between the holders 20 and 21 at the derailleur side, are designed to keep the inner wire undeflected at the maximum length of each interval. The maximum length is, depending upon the inner wire's diameter, preferably not more than 15 mm.

Although the holder 30 has been shown mounted on the fixing plate 25 as aforesaid, it may be directly fixed to the bicycle's frame, or to a separate member fixed to the frame near the plate 25. The holder 21 at the derailleur 10, other than being mounted on the fixing member 11 thereof, may be mounted to a separate support fixed to the bicycle frame close to the derailleur 10 or to the linkage member 14 as shown in FIG. 10.

Furthermore, other than being mounted to the tip of the support plate 19 as abovementioned, the holder 20 for the inner wire 2 at the side of the derailleur 10 may, as shown in FIG. 10, be mounted on the movable member or on a link swingingly supported to an arm pivoted to the fixing member 11. In this instance, the arm swings through the link to move the movable member 16.

In addition, when the holder 30 is mounted to the frame or the support attached thereto, the control lever pivotally supported with the lever shaft 24 may be supported with the inner wire 2 only.

Figure 3:
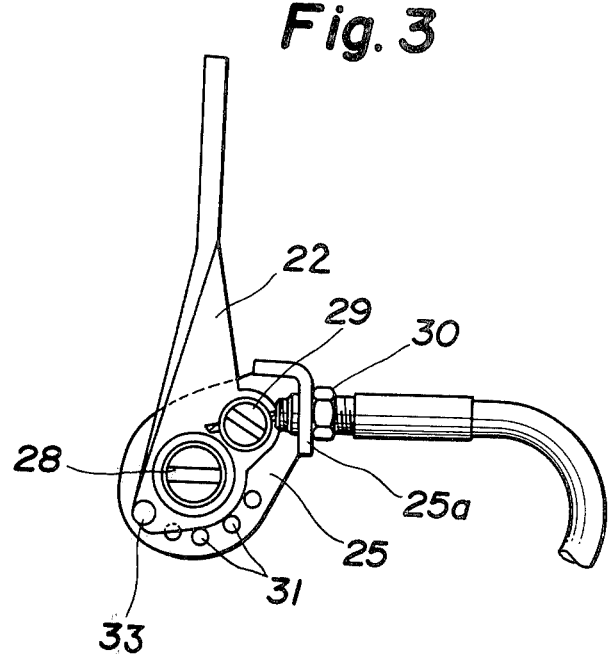
FIG. 3 is a front view of a modified embodiment of the control lever.
Figure 4:
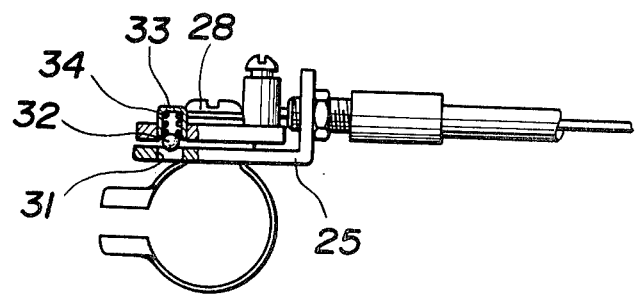
FIG. 4 is a partially cutaway side view thereof.
Figure 5:
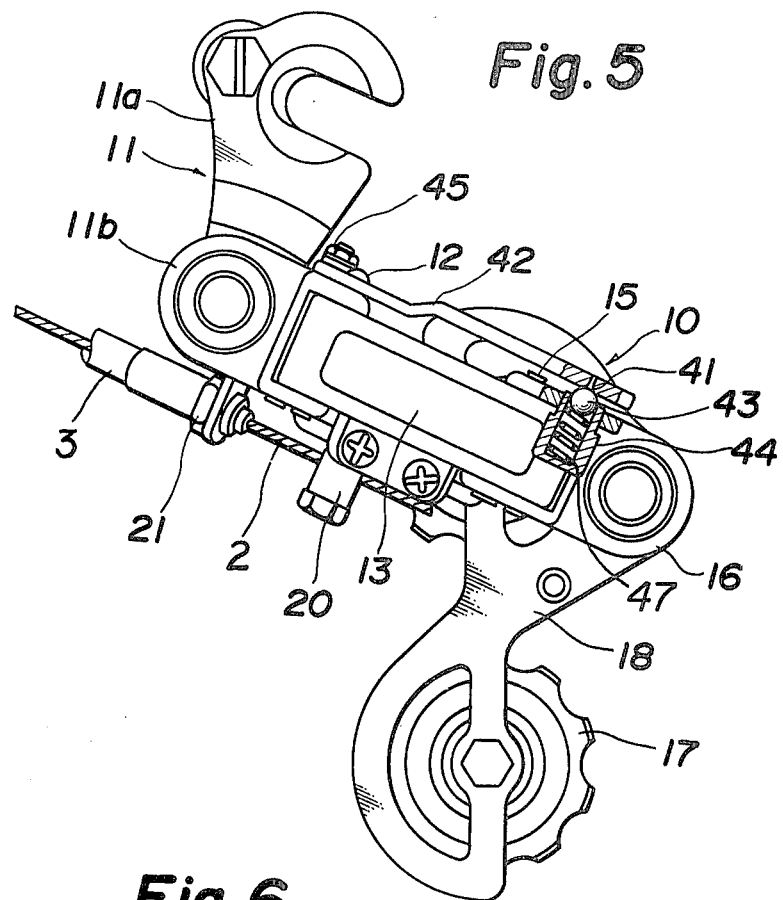
FIG. 5 shows another modified embodiment of the derailleur of the invention.
Figure 6:
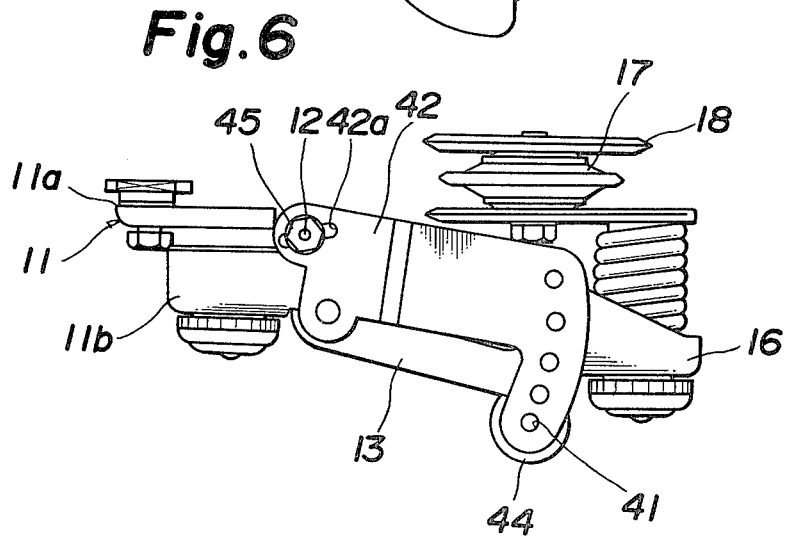
FIG. 6 is a bottom view of the derailleur in FIG. 5.

In the aforesaid construction, the frictional resistance applied to the control lever 22 holds the movable member 16, and particularly the chain guide cage 18, in its position corresponding to the selected speed-changing stage. Also, either one of the lever 22 or the fixing plate 25 may, as shown in FIGS. 3 and 4, be provided at regular intervals with a plurality of recesses 31 corresponding to the speed change stage, and the other may be provided with a retainer 33 holding a ball 32 insertably engageable with and disengageable from each of the recesses 31 so that the ball 32 pushed by a spring 34 may move against the spring force by the lever 22 control so that the ball can be disengaged from one of the recesses 31 and subsequently engaged with next one. Additionally, one of the four members of the derailleur: the fixing member 11, the two linkage members 13 and 14, and the movable member 16, may, as shown in FIGS. 5 and 6, be provided with a support 42 having a plurality of recesses 41 corresponding to the speed change stages respectively, and another one member may be provided with a retainer 44 carrying a ball 43 insertably engageable with and disengageable from each of the recesses 41. When the recesses 41 are, as shown in FIGS. 5 and 6, formed at the fixing member 11 or the movable member 16 side, the support 42 is needed. However, that support is not necessary when the recesses are formed at either one of the linkage members 13 and 14.

When used as shown in FIGS. 5 and 6, the support 42 extends toward the movable member 16 to reach the end portion of each of the linkage members at the movable member side and has, at the foremost end, a plurality of the recesses 41 which are spaced at regular intervals along the path of travel of the linkage members 13 and 14. The intervals correspond to the travel of the linkage members through the desired speed change stages respectively, and are formed in an opened dish-like shape for permitting the ball 43 to slip into each of the recesses 41.

The support 42 is so formed that at the base thereof is formed an elongated bore 42a having rounded ends as shown in FIG. 6. The pin 12 is inserted into the bore 42a to pivotally support the link 14, a threaded extension of the pin 12 is inserted through the bore 42a to be screwed with a nut 45 so that the support 42 is secured to the fixing member 11 in an accurate position corresponding to the position of the chain guide pulleys 17 with respect to the freewheel, thereby positioning each of the recesses 41 to meet the desired speed changing stage.

The retainer 44, which is fixed to the movable member 16 as shown in FIGS. 5 and 6, has formed therein a cylinder having a closed bottom receiving therein, through a coil spring 47, a ball engageable with each of the recesses 41.

As best seen from the aforesaid construction, the bicycle's speed change is available by shifting the driving chain to a selected sprocket by means of the displacement of the movable member 16. At that time, the retainer 44 also swings to be engaged, through the ball 43, with one of the recesses 41 to thereby hold the derailleur in an optional speed change stage.

In addition, the aforesaid speed-changing device has its inner wire 2 covered, at both exposed end portions beyond the retained portion of the outer cable 3, with rigid sleeves 4 and 5 which are longer than the maximum length of each of the exposed portions. The sleeves 4 and 5 are fixed to the inner wire 2 to prevent it from buckling at the exposed portions thereof.

Referring to FIG. 7, the holders 21 and 30 for the outer cable 3 are formed in a cylindrical shape, and the sleeves 4 and 5, which are longer than the maximum length of the exposed portions of the inner wire 2 over the holders 21 and 30, are fitted onto the exposed portions. The foremost end of each of the sleeves 4 is inserted into the holders 21 and 30 respectively so that the sleeves may travel together with the inner wire 2, thereby preventing buckling of the exposed portion of the inner wire.

The inner wire 2 is exposed to the maximum extent from the holder 30 for the outer cable 3 at the side of the lever 22 when fully pulled by the lever 22, and is exposed to the maximum extent from the holder 21 at the side of the derailleur 10 when fully pushed by the lever 22.

The sleeves 4 and 5 are molded by die-casting, and simultaneously attached to the inner wire 2. The sleeve 5 at the side of the lever 22 is, if necessary, die-casted into a shape with a swollen end portion 2a as shown in FIG. 8, and when separately formed from the sleeve, the swollen portion 2a may, as shown in FIG. 9, be soldered to the sleeve already attached to the inner wire 2.

The sleeves 4 and 5, which are directly fixed to the inner wire 2, may be fixed by the holders 20 and 29 together with the inner wire, as shown in FIG. 10 through 13.

The derailleur shown in FIG. 10 has the holder 21 for the outer cable 3 at the linkage member 14 and the holder 20 for the inner wire 2 at the movable member 16. The sleeve 4 is, as shown in FIG. 11, partially cutout at substantially the intermediate portion thereof. The holder 20 is formed of a through hole 20a receiving the sleeve 4 therein. The movable member 16, having an arm 16a extending therefrom, is provided at the tip thereof with a recess 16b of semi-circular section, extending in the direction of the inner wire 2 and coincident with the outer surface thereof so that the inner wire 2 is, as shown in FIG. 12, inserted into the through hole 20a together with the sleeve 4. Thus, the cutout 4a is fitted lengthwise to the arm 16a, and thereafter, the holder 20 is screwably tightened with a nut 20b thereby simultaneously fixing the sleeve 4 and inner wire 2 to the arm 16a.

Thus, when the aforesaid sleeves 4 and 5 are used, the inner wire 2 is, even when exposed to the maximum extent over the retained portion of the outer cable 3 due to the rotation of the lever, free from buckling by being covered at both ends with the sleeves respectively, thereby making accurate speed change possible.

As clearly understood from the aforesaid description, the speed-changing device of the invention can effect the bicycle's speed change by operating the control lever back and forth to push and pull the control wire so that a single wire is usable for the above operation. Accordingly, the device is simple in construction and inexpensive to manufacture as compared with the conventional one, and further requires no return spring even though only a single control wire is used so that no frictional resistance need be applied to the control lever to overcome the return spring force. Hence, the speed-changing device of the invention can effect the speed change very lightly in comparison with the conventional device which must be controlled with a great force in excess of the restoring force of the return spring and the frictional resistance of the lever.

Although preferred embodiments of the invention have been shown and described in detail, it will be understood that changes and variations may be made without departing from the spirit or scope of the following claims.

What is claimed is:

1. In a speed-changing device for a bicycle which comprises:
   a derailleur comprising a fixing member, a pair of linkage members, a movable member having a chain guide cage, said movable member being supported by the fixing member through the pair of linkage members and being relatively movable with respect to the other members,
   a movable control lever, and
   transmitting means for transmitting the movement of the control lever to the derailleur, the improvement wherein:
   said transmitting means comprises an outer cable, a relatively inflexible inner cable and rigid sleeves for said inner cable fixed thereto;
   a fixed body supporting said control lever therewith;
   retaining means for retaining said outer cable at one end thereof to said fixed body and retaining the other end thereof to one of said fixing member and one of said pair of linkage members; and
   said inner cable being within said outer cable and extending at each end thereof in a substantially straight line beyond the retained ends of the outer cable, said sleeves preventing buckling of the end of said inner cable extending from the end of said outer cable, said inner cable being retained at one end to said control lever and being retained at the other end to one of said fixing member, one of said pair of linkage members, and said movable member, said inner and outer cables being on separate members and movable relative to each other, said sleeves being longer than the maximum exposed portions of the inner cable from said ends of said outer cable and slidable within said retaining means whereby when said control lever is moved, said inner cable is pushed or pulled thereby so that said movable member may move.

2. In a speed-changing device for a bicycle according to claim 1, further comprising a support plate having a tip mounted on one of said fixing member, said linkage members and said movable member, said support plate being extended at said tip thereof on a line of extension from said other retained end of said outer cable, and a holder on the tip for retaining therewith said other end of said inner wire so that said inner wire may be retained in alignment with the extension line from said other retained end of said outer cable.

3. In a speed-changing device for a bicycle according to claim 1, wherein said fixed body swingingly rotatably supports said lever thereon, and including a plurality of recesses, at regular spaced intervals therebetween defined in one of said control lever and said fixed body, and an engagement on the other one of said control lever and said fixed body engageable with said recesses so that, when reciprocated by said control lever, said movable member of the derailleur may be kept in a desired position corresponding to the speed change stage.

4. In a speed-changing device for a bicycle according to claim 1, wherein said sleeves are fixed to said control lever and said derailleur through holders.

* * * * *